United States Patent [19]

Onoue

[11] Patent Number: 4,820,211
[45] Date of Patent: Apr. 11, 1989

[54] DRIVESHAFT SUPPORTING DEVICE FOR MARINE PROPULSION ENGINE

[75] Inventor: Akihiro Onoue, Hamamatsu, Japan

[73] Assignee: Sanshin Kogyo Kabushiki Kaisha, Hamamatsu, Japan

[21] Appl. No.: 66,818

[22] Filed: Jun. 25, 1987

[30] Foreign Application Priority Data

Jul. 4, 1986 [JP] Japan .................................. 61-156159

[51] Int. Cl.⁴ .............................................. B63H 21/28
[52] U.S. Cl. ......................................... 440/83; 440/52; 384/225; 384/303
[58] Field of Search .................. 440/83, 84, 86, 75, 440/76, 78, 44, 52; 384/590, 218, 225, 223, 611, 620, 303

[56] References Cited

U.S. PATENT DOCUMENTS

| | | | |
|---|---|---|---|
| 1,740,856 | 2/1931 | Evinrude | 440/83 |
| 2,539,287 | 1/1951 | Trist | 384/303 |
| 2,609,783 | 9/1952 | Kiekhaefer | 440/83 |
| 2,785,022 | 3/1957 | Lakey | 384/303 |
| 3,826,544 | 7/1974 | Anderson | 384/303 |
| 4,421,426 | 12/1983 | Furukawa | 384/225 |
| 4,650,430 | 3/1987 | Schiek | 440/83 |

Primary Examiner—Joseph F. Peters, Jr.
Assistant Examiner—Clifford T. Bartz
Attorney, Agent, or Firm—Ernest A. Beutler

[57] ABSTRACT

An outboard motor having an improved arrangement for supporting and preloading a thrust bearing of a driveshaft. The preloading device comprises a plurality of relatively small diameter stiff coil springs that encircle the driveshaft and place a compressive force on the thrust bearing.

5 Claims, 4 Drawing Sheets 4,820,211

DRIVESHAFT SUPPORTING DEVICE FOR MARINE PROPULSION ENGINE

BACKGROUND OF THE INVENTION

This invention relates a driveshaft supporting device for a marine propulsion unit and more particularly to an improved arrangement for preloading the thrust bearing in a driveshaft support so as to avoid noise.

As is well known, marine outward drives normally incorporate a driveshaft that is supported within an outer housing for rotation about a vertically extending axis. The rotational support for the driveshaft includes a thrust bearing for taking the thrust loading on the driveshaft. However, the speed of rotation of the driveshaft is frequently changed and furthermore, the propeller thrust or the driving thrust at the lower end of the driveshaft may fluctuate so as to cause varying forces to be exerted upon the driveshaft in axial directions. As a result, the driveshaft tends to move vertically relative to the thrust bearing under such changes in loading and this movement will cause noise to be generated as clearances are taken up.

It has, therefore, been proposed to provide a biasing arrangement for preloading the thrust bearing. Such biasing arrangement of the type previously proposed employ a coil spring which encircles the driveshaft and bears against it and its supporting housing so as to preload the thrust bearing. However, because of the extremely compact nature of these outboard drives it is very difficult to provide a coil spring that will have sufficient strength so as to maintain the necessary preload to avoid noise.

It should also be born in mind that it is desirable to position the spring above the water level so that if it adds any size to the driveshaft housing this size increase will occur above the water line so as to reduce the flow resistance. However, the previously proposed arrangements have not, for the reasons already noted, afforded sufficient preloading on the thrust bearing so as to avoid noise and wear on the thrust bearing due to the fluctuations in loading.

It is, therefore, a principle object of this invention to provide an improved driveshaft support for a marine outboard drive.

It is a further object of this invention to provide an improved driveshaft support for a marine outboard drive in which adequate biasing springs may be incorporated so as to preload the thrust bearing.

It is yet another object of the invention to provide an arrangement for preloading the thrust bearing in a marine outboard drive to avoid noise.

SUMMARY OF THE INVENTION

This invention is adapted to be embodied in a thrust bearing arrangement for a driveshaft of a marine outboard drive that comprises an outer housing which is adapted to be affixed to the transom of an associated water craft. A driveshaft is supported for rotation about a vertically extending axis relative to the outer housing by means that include a thrust bearing. Biasing spring means comprising a plurality of coil spring are disposed around the driveshaft and maintain pressure on the thrust bearing.

DETAILED DESCRIPTION OF THE PREFERRED EMBODIMENT OF THE INVENTION

Figure 1:
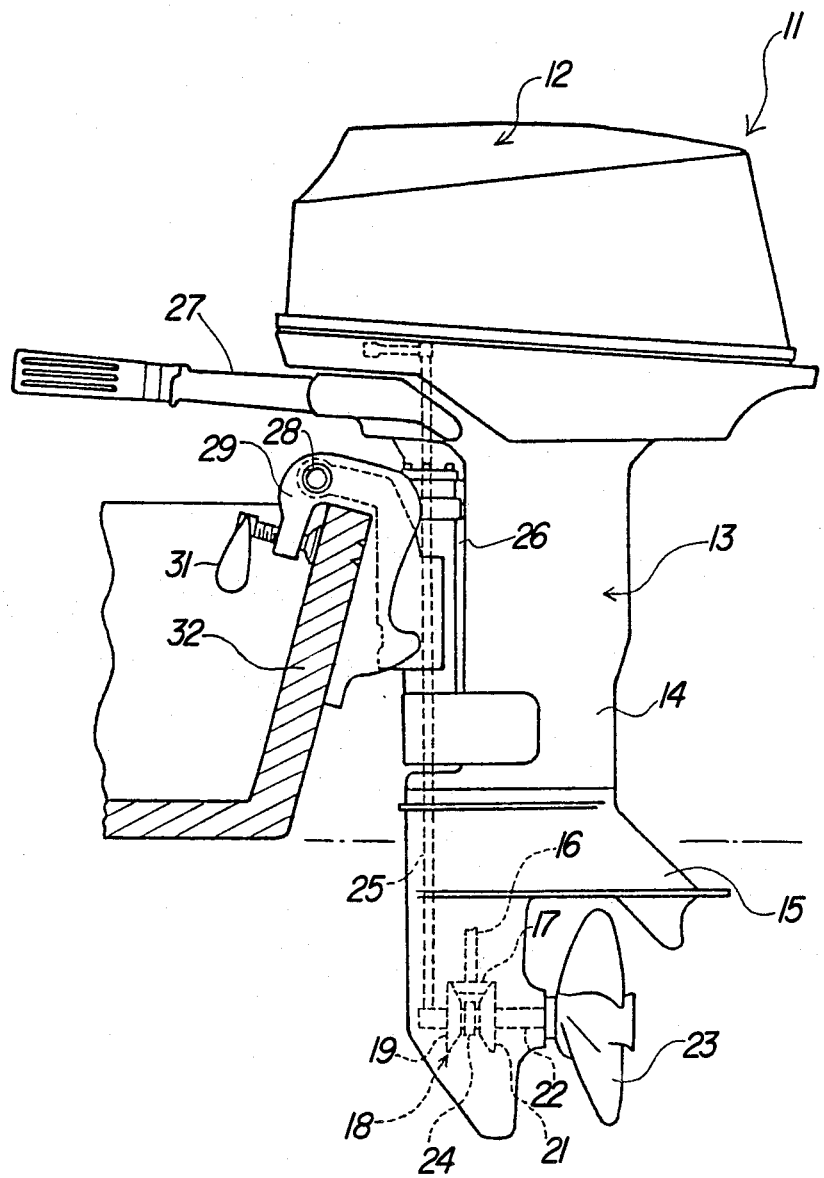
FIG. 1 is a side elevational view of an outboard motor incorporating a driveshaft support constructed in accordance with an embodiment of the invention and as attached to the transom of an associated water craft, which is shown partially and in cross-section.
Figure 2:
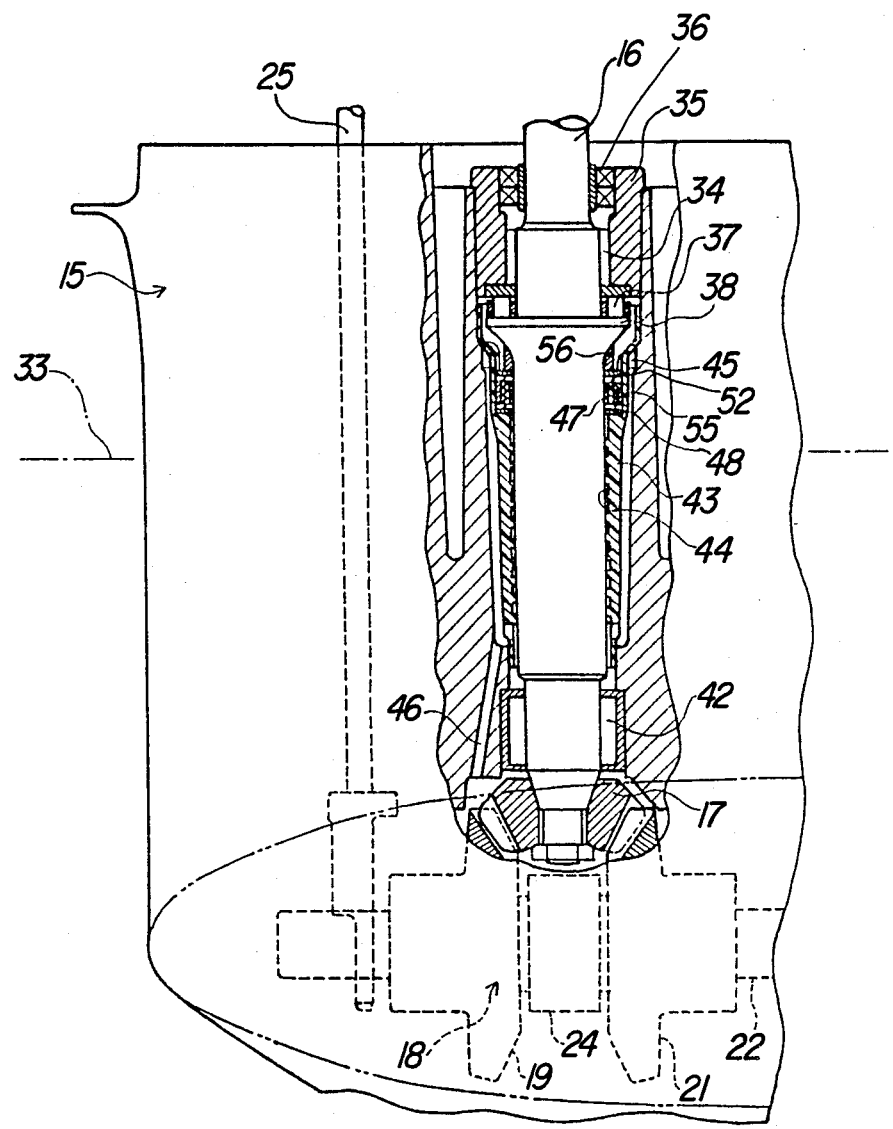
FIG. 2 is an enlarged side elevational view showing the driveshaft support, with a portion broken away to more clearly show the construction.
Figure 3:
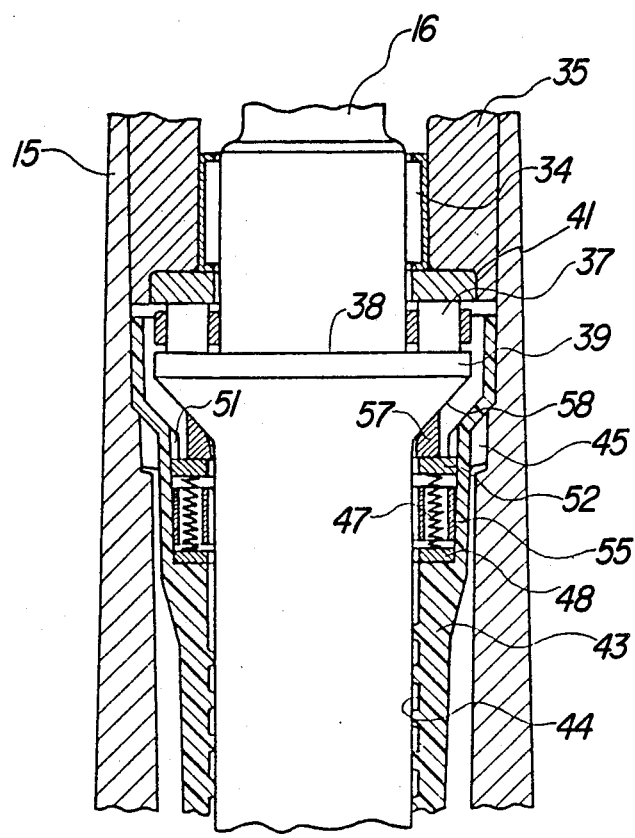
FIG. 3 is a further enlarged cross-sectional view of the driveshaft support.
Figure 4:
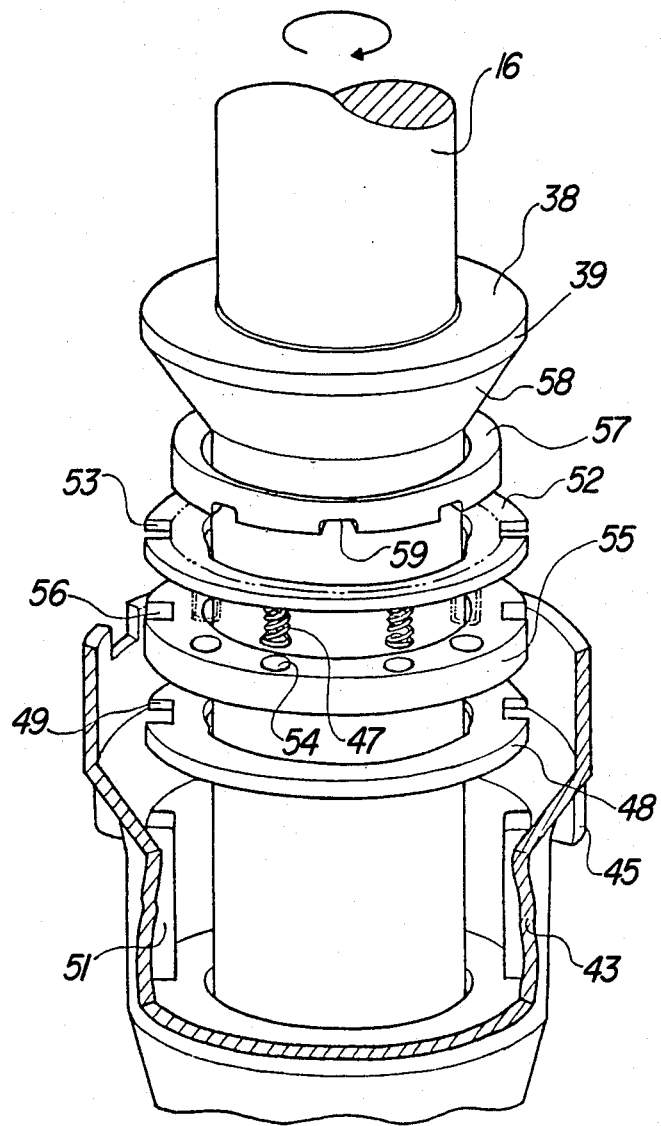
FIG. 4 is an enlarged, partially exploded, perspective view showing the driveshaft support.

Referring first to FIG. 1, an outboard motor constructed in accordance with an embodiment of the invention is identified generally by the reference numeral 11. Although the invention is described in conjunction with an outboard motor, it is to be understood that the invention may be equally well practiced with the outboard drive portion of a marine inboard-outboard drive. For that reason, the term outboard drive is used herein generically to encompass either an outboard motor per se or the outboard drive portion of an inboard-outboard drive.

The outboard motor 11 includes a power head, indicated generally by the reference numeral 12 and which is comprised of a powering internal combustion engine that is surrounded by a protective cowling. A driveshaft housing 13 depends from the power head 12 and rotatably journals a driveshaft, in the manner described. The driveshaft housing 13 includes an outer housing 14 from which a lower unit 15 depends.

The driveshaft, which is indicated generally by the reference numeral 16, extends through the lower unit 15 and has affixed to it a bevel gear 17 of a forward neutral reverse transmission, indicated generally by the reference numeral 18. This transmission includes a pair of oppositely disposed bevel gears 19 and 21 that are in mesh with the driving bevel gear 17 on diametrically opposite sides. As such, the bevel gears 19 and 21 will be continuously driven in opposite directions.

The bevel gears 19 and 21 are journaled upon a propeller shaft 22 which is, in turn, journaled in a known manner within the lower unit 15. A propeller 23 is affixed to the propeller shaft 22 for rotation with it. A dog clutching element 24 is disposed between the bevel gears 19 and 21 and is splined for rotation with the propeller shaft 22. The dog clutching element 24 is adapted to be slid axially into engagement with cooperating dog clutching elements formed on the gears 19 or 21 so as to rotatably couple these gears for rotation with the propeller shaft 22 so as to drive the propeller 23 in selected forward and reverse directions. A shift rod 25 is supported within the driveshaft housing 13 and lower unit 15 and operates the dog clutching element 24 in a known manner.

A steering shaft (not shown) is affixed to the driveshaft housing 13 and is journaled within a swivel bracket 26 for steering of the outboard motor 11 about a vertically extending steering axis. A tiller 27 is affixed to the upper end of the steering shaft for this steering operation. The swivel bracket 26 is, in turn, pivotedly supported by means of a pivot pin 28 and clamping bracket 29 for tilting movement of the outboard motor 11 about a horizontally disposed tilt axis defined by the pivot pin 28. The clamping bracket 29 is provided with a clamp 31 so as to afford a detachable connection to a transom 32 of an associated water craft.

The construction of the outboard motor as thus far described may be considered to be conventional and is depicted only for exemplary purposes. The invention relates to the support for the driveshaft 16 and will now be described in detail by reference to the remaining figures.

The driveshaft 16 is supported about the water line, indicated by the line 33, by means of an upper radial bearing 34. The bearing 34 engages the driveshaft 16 and is held in place by means of a bearing housing 35. The bearing housing 35 also carries a seal 36 for providing a seal between the bearing housing 35 and the upper end of the driveshaft 16 above the bearing 34.

A thrust bearing 37 vertically supports the driveshaft 16. The thrust bearing 37 is loaded between a shoulder 38 formed on a projection 39 of the driveshaft and a spacer plate 41 that is held in place by the bearing housing 35.

There is also provided a lower radial bearing 42 that is carried by the driveshaft housing 15 in proximity to the bevel gear 17 for rotatably journaling the lower end of the driveshaft 16.

A sleeve 43 encircles a portion of the driveshaft 16 between the bearing 42 and the projection 39 and is formed with a helical internal groove 44. The sleeve 43 is held against rotation by means of a key 45 formed on the upper end of the sleeve which engages a mating recess in the driveshaft housing 15. As a result, the rotation of the driveshaft 16 will draw lubricant upwardly through the groove 44 because of its hand to lubricate the thrust bearing 3 and upper radial bearing 34. This lubricant is delivered through a lubricant passage 46 that extends through the driveshaft housing to an area in proximity to the bevel gear 17.

In accordance with the invention, an arrangement is provided for maintaining a preload on the thrust bearing 37 so as to avoid the taking up of clearances upon torque fluctuations which would result in noise. This arrangement includes a plurality of coil compression springs 47 that are disposed in nested relationship around the driveshaft 16 at a point above the water level 33. Because of their small diameter, the springs 47 may be made quite stiff and thus will exert a relatively high axial force upon the driveshaft 16. The springs 47 bear at their lower end against a plate 48 which is received in a recess in the sleeve 43 and which is held against rotation by cooperation of a notch 49 in the plate 48 with a key 51 formed internally of the sleeve. The upper ends of the springs 47 bear against a further plate 52 which is also held against rotation by cooperation of a key way or slot 53 with the key 51 of the sleeve. The circumferential spacing of the springs 47 is maintained by having each of the springs 46 retained in a respective bore 54 of a spring retainer plate 55 which is disposed between the plates 52 and 48. The spring retainer 55 is also held against rotation through cooperation of a slot 56 with the sleeve key 51.

The plate 52 bears against a bearing ring 57 that has an inclined or tapered upper opening that cooperates with a tapered surface 58 formed on the under side of the driveshaft projection 39. The result, the driveshaft 16 will be urged upwardly so as to maintain the thrust bearing 37 under compression.

The underside of the thrust bearing ring 57 is provided with recesses or notches 59 so as to permit lubricant to flow outwardly under the action of the cooperation of the driveshaft 16 with a helical grooves 44 so that it may reach the bearings 37 for their lubrication.

It should be readily apparent from the foregoing description that a very compact yet high force coil spring arrangement is provided that will keep the thrust bearing under constant load and thus avoid noise due to the taking up of clearances under variations in driving force. Although an embodiment of the invention has been illustrated and described, various changes and modifications may be made without departing the spirit and scope of the invention, as defined by the appended claims.

I claim:

1. A thrust bearing arrangement for a driveshaft of a marine outboard drive comprising an outer housing adapted to be affixed to the transom of an associated water craft, a driveshaft supported for rotation about a vertically extending axis relative to said outboard housing by means including a thrust bearing acting only in an upward direction, an annular collar encircling said driveshaft and, biasing spring means comprising a plurality of coil springs disposed around said driveshaft and acting directly in said annular collar for yieldably urging said driveshaft in an upward direction for maintaining pressure upon said thrust bearing.

2. A thrust bearing arrangement as set forth in claim 1 wherein the coil springs have a diameter significantly less than the diameter of the driveshaft and have their axes in parallel relationship to the driveshaft.

3. A thrust bearing arrangement as set forth in claim 2 wherein the coil springs are interposed between a pair of bearing plates, one of said bearing plates being engaged with the driveshaft housing and comprising said annular collar and other of said bearing plates being engaged with the driveshaft.

4. A thrust bearing arrangement as set forth in claim 3 further including spacer means interposed between the bearing plates and having individual openings for receiving and spacing the coil springs relative to each other.

5. A thrust bearing arrangement as set forth in claim 3 further including means for holding the bearing plates against rotation.

* * * * *